(12) United States Patent
Layne et al.

(10) Patent No.: US 6,223,889 B1
(45) Date of Patent: May 1, 2001

(54) MODULAR LINK CONVEYOR WITH INTERDIGITATING GRID AND INTERLEAVING SIDE WINGS

(75) Inventors: James L. Layne, Bowling Green; Michael D. McDaniel, Glasgow, both of KY (US)

(73) Assignee: Span Tech LLC, Glasgow, KY (US)

( * ) Notice: Subject to any disclaimer, the term of this patent is extended or adjusted under 35 U.S.C. 154(b) by 0 days.

(21) Appl. No.: 09/233,584

(22) Filed: Jan. 19, 1999

Related U.S. Application Data (63) Continuation-in-part of application No. 08/978,223, filed on Nov. 25, 1997, now Pat. No. 6,041,917, which is a continuation of application No. 08/660,551, filed on Jun. 10, 1996, now Pat. No. 5,690,210.

(51) Int. Cl.[7] .................................................... B65G 17/06
(52) U.S. Cl. ............................................................. 198/853
(58) Field of Search ................................... 198/850, 851, 198/852, 853

(56) References Cited

U.S. PATENT DOCUMENTS

| | | |
|---|---|---|
| 3,880,276 | 4/1975 | Willett, III . |
| 3,881,593 | 5/1975 | Mushovic et al. . |
| 4,645,070 | 2/1987 | Homeier . |
| 4,953,693 | 9/1990 | Draebel . |
| 4,993,544 | 2/1991 | Bailey et al. . |
| 5,031,757 | 7/1991 | Draebel et al. . |
| 5,058,732 | 10/1991 | Lapeyre . |
| 5,174,439 | 12/1992 | Spangler et al. . |
| 5,181,601 | 1/1993 | Palmaer et al. . |
| 5,215,185 | 6/1993 | Counter et al. . |
| 5,224,583 | 7/1993 | Palmaer et al. . |
| 5,293,989 | 3/1994 | Garbagnati . |
| 5,335,768 | 8/1994 | Schladweiler . |
| 5,358,096 | 10/1994 | Faulkner et al. . |
| 5,372,248 | 12/1994 | Horton . |
| 5,431,275 | 7/1995 | Faulkner . |
| 5,489,020 | 2/1996 | Clopton . |
| 5,497,874 | 3/1996 | Layne . |
| 5,690,210 | 11/1997 | Layne . |
| 5,738,205 | 4/1998 | Draebel . |
| 5,775,480 | 7/1998 | Lapeyre et al. . |
| 6,041,917 | 3/2000 | Layne et al. . |

Primary Examiner—James R. Bidwell
(74) Attorney, Agent, or Firm—King & Schickli, PLLC (57) ABSTRACT

A modular link conveyor includes a plurality of modular link assemblies made up of links of an improved design assembled to create a closely interdigitating conveying surface. The improved links eliminate undesirable gaps or openings in the conveying surface. Projecting fingers are provided for filling the openings between the legs of each link and also between adjoining links. The fingers aid in preventing the entry of any foreign objects in these openings. In a first alternative embodiment, the fingers are arcuate projections that extend across the legs adjacent to both openings. In a second alternative embodiment, the modular link assemblies carry a plate which forms the conveying surface. The plate is provided with alternating forwardly and rearwardly projecting fingers for filling the openings in the conveyor surface. The improved conveyor may also include special side links formed by the inclusion of wings that interleave during the turning of the conveyor to prevent the entry of any foreign objects along the side edges of the conveyor. The wings are formed having at least two tiers.

20 Claims, 5 Drawing Sheets

MODULAR LINK CONVEYOR WITH INTERDIGITATING GRID AND INTERLEAVING SIDE WINGS

This application is a continuation-in-part of U.S. patent application Ser. No. 08/978,223, entitled "Modular Link Conveyor with Interdigitating Grid and Open Apex," filed Nov. 25, 1997, now U.S. Pat. No. 6,041,917 which is an continuation of U.S. patent application Ser. No. 08/660,551, entitled "Modular Link Conveyor with Interdigitating Grid," filed Jun. 10, 1996, now U.S. Pat. No. 5,690,210.

TECHNICAL FIELD

The present invention relates generally to modular conveyors for moving articles or products along a path and, more particularly, to a modular conveyor link of improved design for establishing a closely interdigitating conveying surface and for improved cleaning and inspection.

BACKGROUND OF THE INVENTION

Today, in many modem manufacturing facilities, modular conveyor systems are extensively utilized to transport articles to and from various work stations during all stages of production. In recent years, manufacturers using production lines with conveyors as an integral component of the material handling system have realized reasonably significant gains in productivity and resource utilization. As a result, modular conveyor systems have become even more widely implemented and have been adapted to meet an even wider scope of the material handling needs of producers of a multitude of consumer and industrial goods. Therefore, the continual development of improved modular conveyors is necessary in order to keep pace with the demands and expectations of the users of such conveyors.

Thus, notwithstanding recent developments and advancements in conveyor designs, further improvements in the overall design and interaction of the plurality of individual links which make up the conveying surface are desired. One such needed improvement relates to elimination of undesirable gaps or openings which may exist in the conveying surface so as to better ensure a proper functioning and easy to clean conveyor. Furthermore, smooth link interaction is important, both while the links are moving from an expanded state to a compressed state, or vice-versa, as well as while in a fully or partially compressed state, such as during negotiation of a tight turn. Modular conveyors are often employed for transporting small articles, especially in the food industry, so that minimizing the gaps/openings is necessary for efficient support of the articles during conveying, which in turn minimizes downtime due to jamming, as well as cutting down on the waste and cleaning requirements.

In an effort to develop a modular conveyor assembly having the desired characteristics described above, prior art modular conveyors have routinely included links having forward and rearward extending segments that closely interconnect, and substantially close together especially while the conveying surface is in a compressed state. For example, U.S. Pat. No. 4,953,693 to Draebel, owned by the Assignee of the present invention, discloses a closed grid type conveyor assembly wherein there are minimal gaps/openings in the conveying surface once compressed. However, the possibility does exist for objects to fall into gaps/openings which may exist either prior to compression or while maneuvering through a turn. If so, these objects would prevent the links from functioning properly. Furthermore, the blunt ends of the links typical of prior art modular links are unable to lift upward any such foreign objects present in the gaps/openings.

Similarly, U.S. Pat. No. 5,174,439 to Spangler et al. also discloses a relatively closed grid type conveyor assembly having closely interconnected links. The link interconnection is enhanced with an undercut being provided on the forward extending portion of the link in order to provide clearance under the rearward extending portion of the next forward link. Nonetheless, there still exists the possibility for objects to fall into or become lodged in gaps/openings between the links while the conveying surface is in an expanded state or while making a turn. There would then be no way for the objects to be lifted out of the gaps/openings. While the undercut may enhance the interconnection of the links, the link end having the undercut is still somewhat blunt and would be unable to effectively lift upward any foreign objects inadvertently present between the links.

Another approach in the prior art adopted in an effort to improve material handling capabilities has been to construct an open grid type modular conveyor assembly capable of receiving spaced article engaging inserts. For example, U.S. Pat. No. 5,497,874 to Layne, also owned by the Assignee of the present invention, discloses such an open grid type conveyor assembly. While some openings are incidentally closed in this type of conveying surface where the inserts are developed, the elimination of other unnecessary openings along the conveyor is desirable. Additionally, the blunt ends of the links are similar to other prior art link ends and, thus, are unable to lift and free foreign objects present between the links.

Thus, it is clear that a need exists for a modular conveyor constructed from smooth interacting links for a wide range of sizes and types of articles. The closely interdigitating links have the capability of minimizing the possibility of small articles or objects from falling into or becoming lodged in gaps or openings on the conveying surface. Such a conveyor assembly would provide adequate support for the articles during conveying, as well as minimize waste, and ease cleaning and inspection requirements. In addition, it is also important that such a conveyor maintain the ability to effectively maneuver through a turn while maintaining the interdigitation. Another feature would be to include special side links that also minimize the possibility of small articles or similar objects falling through the conveyor in both the compressed or expanded state while retaining the ability of the conveyor to negotiate a tight turn.

SUMMARY OF THE INVENTION

It is therefore a primary object of the present invention to overcome the above described limitations and disadvantages of prior art modular link conveyors.

An additional object of the present invention is to provide a modular conveyor having module links of an improved open design which cooperate to form a closely interdigitating conveying surface, while at the same time allowing for easy cleaning and inspection.

Still another object of the present invention is to provide a modular conveyor having module links of an improved design which reduce the potential for objects to fall into or become lodged in gaps or openings that may exist in the conveying surface both prior to, during and following longitudinal compression of the conveying surface.

Yet another object of the present invention is to provide a modular conveyor having modular links, and to provide the links themselves with an improved design to form a closely interdigitating conveying surface while still maintaining the ability to maneuver through curves and bends and provide improved cleaning and inspection capability.

A further object of the present invention is to provide a modular link conveyor having a plurality of links, including special side links with interleaving wings forming a part of the conveying surface to close gaps or openings in both the expanded and compressed state, and including means for guiding the conveyor on the frame.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a modular link conveyor having a plurality of modular link assemblies and modular links of improved design for establishing a closely interdigitating conveying surface is provided. The invention disclosed improves the interaction of the plurality of individual links by eliminating undesirable and unnecessary gaps or openings which may exist in the conveying surface, thus minimizing the possibility for small articles or other objects to fall into or becoming lodged in the gaps/openings. The improved link includes features for achieving the stated purposes both while the links are moving from an expanded state to a compressed state, or vice-versa, such as during negotiation of a turn.

The basic modular conveyor arrangement is disclosed in U.S. Pat. No. 4,953,693 to Draebel, titled "Modular Link Conveyor System" and U.S. Pat. No. 5,497,874 to Layne, titled "Article Engaging Insert for Modular Link Conveyor," both patents being assigned to the Assignee of the present invention. The disclosures of these patents are incorporated herein by reference.

In a first embodiment of the present invention, the improved modular link includes a forwardly extending tongue projecting from the leading apex of the link. Preferably the tongue tapers downward in a horizontal plane and includes a top side and a bottom side which meet at a terminal apex. During normal operation of the conveyor along a straight path, the conveying surface is in an expanded state, i.e. the rows of longitudinally repeating links are generally not compressed together. Once the conveyor begins to negotiate a turn, the links positioned on the inside of the turn begin to compress. Compression results in the leading apex moving forward to occupy an open space between the trailing apexes of the next forward link.

As can be appreciated, as the tongue fills the forward most part of the open space, it captures any small conveyed articles, or similar objects, that happen to be dropped from the conveying surface. The downward taper of the tongue tends to cause the articles/objects to be lifted upward. Thus, this structure allows for the conveying surface to become fully or partially compressed as needed depending upon the radius of the turn, while at the same time keeping the gaps/openings clear. If not for the tapered tongue, any objects present between the links can become jammed causing possible disruption in operation of the conveyor, as well as increase the cleaning requirements. Also, the tongue partially fills the open space while the conveying surface is in an expanded state, thus reducing the size of the gaps/openings.

In accordance with another important aspect of the present invention, the modular link conveyor also includes projecting fingers. In the preferred embodiment, the fingers are positioned between adjoining laterally repeating links and/or between the legs of each individual link. In a manner similar to the forwardly extending tongue as described above, the projecting fingers move during turning or compression of the conveying surface so as to fill any opening between the legs of the next forward/rearward links adjacent the trailing apex. As should be appreciated, the finger moving into the opening thus aids in limiting the entry of or dislodging any objects which may be present in the opening during turning of the conveyor.

The finger is designed to continuously occupy the void between the adjoining links. This further inhibits small articles or other objects from falling into or becoming lodged between the links during operation of the conveyor, even when in an expanded state. In addition, the elimination of unnecessary openings in the conveying surface provides for a more even support of the articles during conveying, while at the same time maintaining the generally open style link construction. Accordingly, the projecting finger is an important component in forming a proper functioning and a more productive modular link conveyor.

In accordance with yet another important aspect of the preferred embodiment of the present invention, the trailing or leading apex of the improved modular link includes a groove to receive the cooperating finger, and which is preferably an open groove which exposes the hole that passes transversely through the apex. More specifically, the open groove exposes the hole and connecting rod which passes through the hole to connect the repeating modular link assemblies together. By exposing the connecting rod and providing access thereto, it is much easier to visually inspect the connecting rod for foreign matter during routine cleaning or for wear following extended periods of use. Indeed, the connecting rod can be accessed through the open groove for cleaning by entry of cleaning solution and high pressure wash. Cleaning in this manner eliminates an important concern for conveyors used in, for example, the food processing industry, where cleanliness, including elimination of bacteria, is of the utmost importance.

Advantageously, longitudinal compression of the conveying surface along the inside of the curve during turning results in the forwardly and/or rearwardly projecting finger, which is axially aligned with the open groove, extending into the open groove on the next forward/trailing link. This allows for the finger to then protrude into the opening between the legs of the adjoining links, as described above.

In accordance with still yet another important aspect of the present invention, the legs of the improved modular link include a two way angled undercut adjacent both the leading apex and the trailing apex. The angle of each undercut is obtuse; approximately 160°–170°. This provides increased clearance and thus cooperation between the links, especially when the path of the conveying surface includes curves or bends. More specifically, the obtuse angles of the undercuts provide additional pivot area for the links.

Additionally, the improved modular link includes a side fin spanning the undercut adjacent the trailing apex for engaging the slot which passes through the leading apex. Advantageously, the side fin functions to further assist and guide the links when it is necessary for the conveying surface to traverse bends and curves. Thus, it should be appreciated that the undercut on the legs and the side fin work together and cooperate to allow the conveying surface to maintain its maneuverability. This interaction is another important aspect of maintaining the smooth interaction between the links and the closely interdigitating conveying surface. Indeed, it should be recognized that all of the improvement features of the present invention function in a cooperative manner in order to provide an optimized functioning modular link conveyor.

In two alternative embodiments, the conveyor is formed of modular link assemblies which also include forwardly or rearwardly projecting fingers for substantially filling the openings in the conveying surface in both the expanded and compressed state. More specifically, in the first alternative embodiment, forwardly projecting fingers extend between the legs of adjacent links and the rearwardly projecting fingers extend between the legs of adjoining links. In the preferred version of this embodiment, the fingers take the form of arcuate projections. As should be appreciated, the arcuate projections serve a similar function as the fingers in forming a portion of the conveying surface and also occupying the openings created between the leading and trailing links when the conveyor is in an expanded state. Instead of providing an open groove for receiving the projecting fingers, the leading and trailing apexes are formed having a reduced vertical dimension relative to the conveying surface. In this manner, the projecting fingers engage the upper surface of the apexes of the respective leading or trailing links as longitudinal compression of the conveyor occurs.

In a second alternative embodiment, the conveyor is formed of modular link assemblies similar to those described above, but further includes a plate forming the conveying surface. The plate is provided with alternating forwardly and rearwardly projecting fingers which serve to fill the openings between the legs of each link and the laterally repeating links, respectively. The plate is preferably integrally formed with the links, but it is within the broadest aspects of the present invention for the plate to be formed separately and attached to the modular links, or to be formed in separate segments on each individual link.

One particular advantage of the first and second alternative embodiments is the enhanced turning ability of the conveyor provided by the different types of projecting fingers. Indeed, during operation of a conveyor constructed in accordance with the principles of the invention proposed in these alternative embodiments, it has been observed that the conveyor is able to turn a significantly tighter radius. This is primarily due to the positioning of the projecting fingers in engagement with the upper surfaces of the trailing/leading apexes, which provides the conveyor with a significant amount of added lateral flexibility.

In accordance with another important aspect of the present invention, the modular link assemblies forming the conveyor may include special side links for positioning at the outermost sides of the laterally repeating links. The side links are adapted to close any gaps or openings that would otherwise be present between the side links in the conveyor, even in the expanded state. More particularly, the side links include wings having multiple levels, or tiers, formed in the upper portion thereof. In addition to forming a portion of the conveying surface adjacent to the side edges of the conveyor, the wings thus interleave in response to the compression of the conveyor, such as is experienced when the traversing a tight turn. When the conveyor is expanded, the forward margin of the upper tier on a rearward link is positioned above and in close proximity to the rear margin of a lower tier of the forward link. During compression, the upper tier of the rearward wing moves over the lower tier of the forward side link, thereby fully closing any small opening or gap presented between the longitudinally repeating links. Thus, whether in the compressed or expanded state, the wings advantageously prevent small articles being conveyed, or any foreign object/debris, from falling through the conveyor at the side edges.

The wings also serve the dual function of supporting a depending arm that assists in guiding the conveyor along a guide rail or the like. The depending arm may also include an inwardly extending guide tab that serves to engage a lip formed in the guide rail of the frame. The tab supports the conveyor during inversion, as the conveyor moves along the return run in an endless conveyor system.

Additionally, in all of the above-described embodiments, at least one pusher element may be included on one or more of the modular links for positively engaging the articles being conveyed. In the preferred embodiment, each pusher element takes the form of an upstanding flange.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention and together with the description serves to explain the principles of the invention. In the drawings:

FIG. 4 is a top plan view showing the interaction between two modular link assemblies, while in an expanded state and traveling in a straight path;

FIG. 5a is a similar plan view showing a variation on the preferred embodiment with both forwardly/rearwardly projecting fingers.

Reference will now be made in detail to the present preferred embodiment of the invention, an example of which is illustrated in the accompanying drawings.

DETAILED DESCRIPTION OF THE PREFERRED EMBODIMENT

Figures 1, 2, 3:
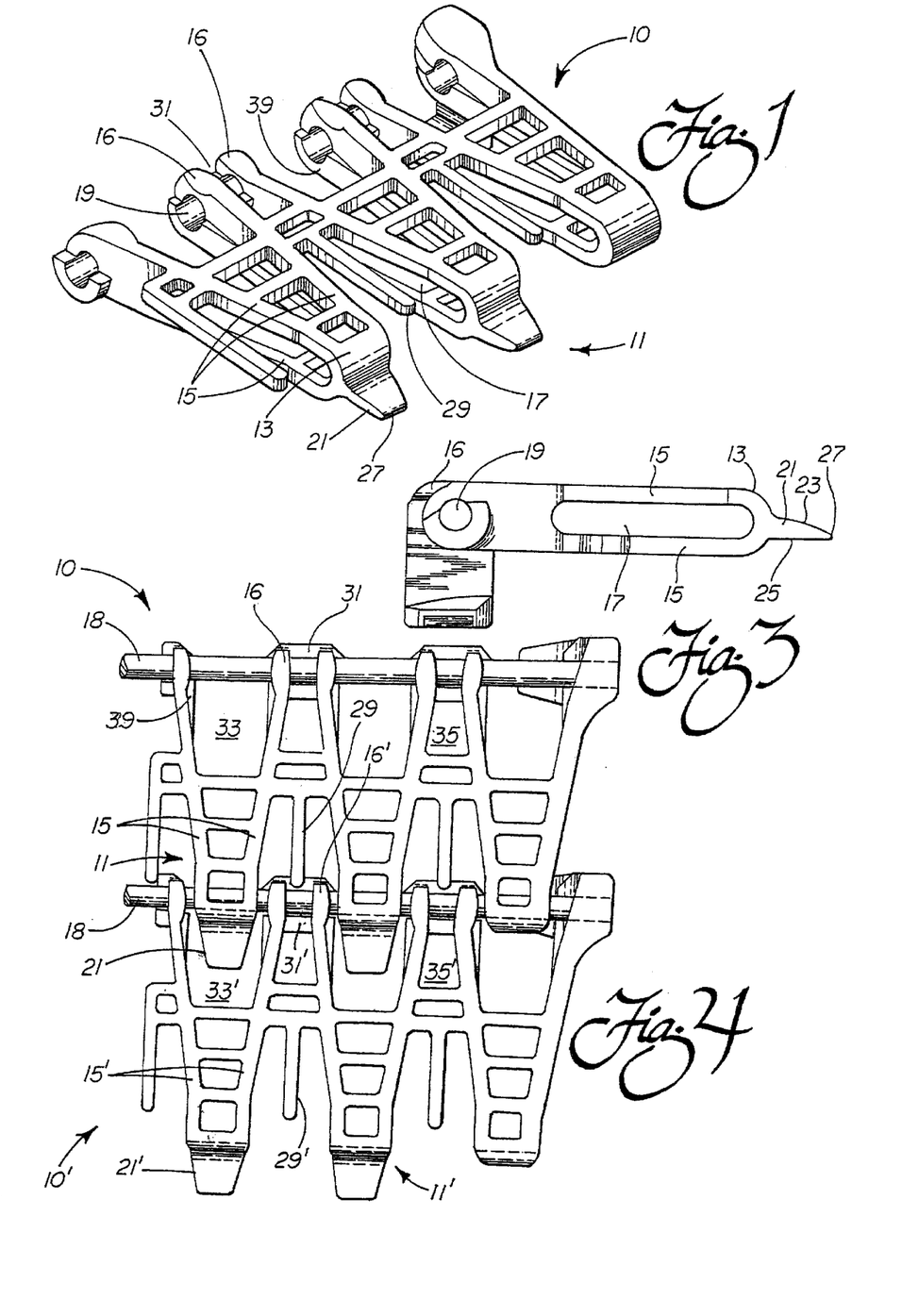
FIG. 1 is a perspective view of one form of modular link assembly comprised of three laterally disposed repeating modular links.
FIG. 2 is a top plan view of the single modular link assembly of FIG. 1.
FIG. 3 is a side elevational view of the single modular link.
Figure 2:
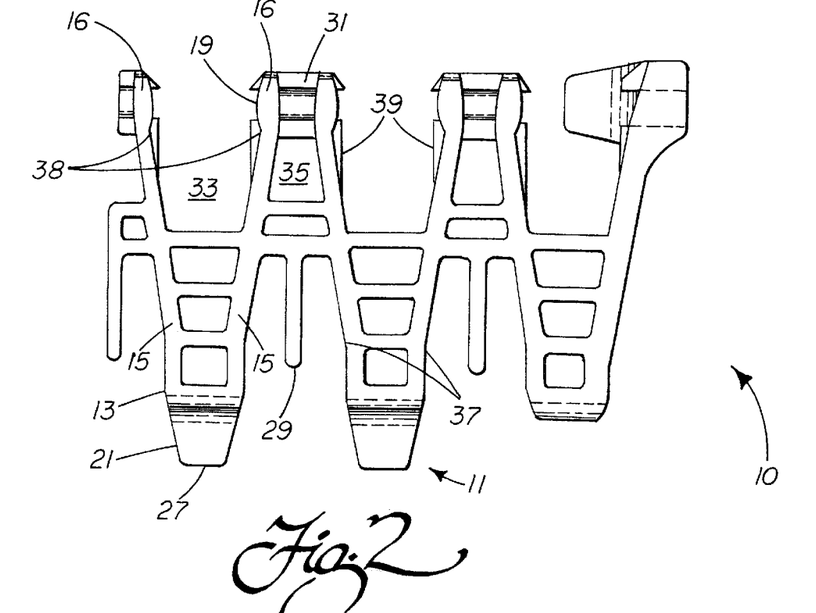

Reference is now made to FIGS. 1 and 2 showing a single modular link assembly 10 comprised of a plurality of individual links 11, which can take the form of either links integrally formed together in any suitable number, or as separate links 11. As will become apparent by reviewing the description below, the assembly 10, and more specifically the individual links 11, are of an improved design so as to establish a closely interdigitating conveying surface, while at the same time assuring that the links have exceptionally smooth interaction with each other during conveying movement. As a result, a more efficient modular link conveyor for moving articles or products along a straight or curved conveying path is obtained.

Each individual link 11 includes a leading apex 13 and a pair of legs 15 extending at an acute angle therefrom. The legs 15 terminate at a trailing apex 16. A plurality of transverse connectors 18 (see FIG. 4) are provided to interconnect and retain the links 11 forming the modular link assembly 10 together, thereby forming a complete modular link conveyor. More specifically, the leading apexes 13 of the links 11 include a transversely oriented slot 17 for receiving the connectors 18. The trailing apex 16 includes a transverse hole 19 for also receiving the connectors 18. The slots 17/holes 19 are co-axial such that each connector 18 passes freely through all aligned holes 19 and slots 17. When properly connected, the connectors 18 join the legs 15 of the links 11 in one row with the leading apexes 13 of the links 11 in the next forward row to form the modular link conveyor.

A more detailed disclosure of the foregoing type conveyor is described in U.S. Pat. No. 4,953,693 to Draebel and U.S. Pat. No. 5,497,874 to Layne, both of which the present invention is an improvement thereof, and the disclosures of both are incorporated herein by reference. While the preferred embodiment of the present invention sets forth improved links 11 and other features for forming an open grid modular conveyor, as disclosed in the '874 patent to Layne, it should be appreciated that these improvements of the present invention may also be used in conjunction with other type modular conveyors.

According to an important aspect of the preferred embodiment of this invention, and as best shown in FIGS. 1 and 3, the links 11 further include a forwardly extending tongue 21 projecting from the leading apex 13. The tongue 21 has a top side 23 and a bottom side 25 which meet at a terminal apex 27. Preferably, the tongue 21 is tapered in the horizontal plane. More specifically, the tongue 21 tapers from the leading apex 13 downward to the terminal apex 27.

As best shown in FIGS. 1 and 2, the assembly 10 further includes a forwardly projecting finger 29 positioned between adjoining links 11. The trailing apex 16 includes a groove, that is preferably an open groove 31 in axial alignment with the finger 29. Advantageously, the open groove 31 exposes the hole 19, and more specifically exposes the connectors 18 which pass transversely through the holes of trailing apex 16. This open groove concept allows for visual inspection of the connectors 18 for ordinary wear. Deleterious mechanical wear can thus be better avoided. Also, the connectors 18 may be accessed via open groove 31 for other purposes such as cleaning; an important concern for modular link conveyors used in, for example, food processing industries. If desired, the leading apex 13 can also include a groove and cooperate with a rearwardly extending finger as a substitute for the tongue. However, since the apex 13 is already open through the existence of the slot 17 this open groove is of only secondary importance.

From the foregoing description, it will be realized that a plurality of laterally and longitudinally repeating modular assemblies 10, and more specifically a plurality of repeating links 11, are assembled to create a closely interdigitating conveying surface. As should be further realized, the improvements of the present invention, for example, the forwardly extending tongue and/or the forwardly/rearwardly projecting finger, eliminate undesirable and unnecessary gaps or openings which may exist in the conveying surface. Thus, the tongue and/or finger concepts are important improvements resulting in an improved interdigitating grid surface for conveying, while at the same time maintaining the basic open design for cleaning. The concept of opening up the leading/trailing apex 13, 16 with an open groove, such as groove 31, also is significant for enhanced cleaning, as well as improved inspection, along with the attendant advantage of being lighter in weight and generally lower in cost. Such individual features, or the combination, are previously unknown in the relevant art.

Figure 5:
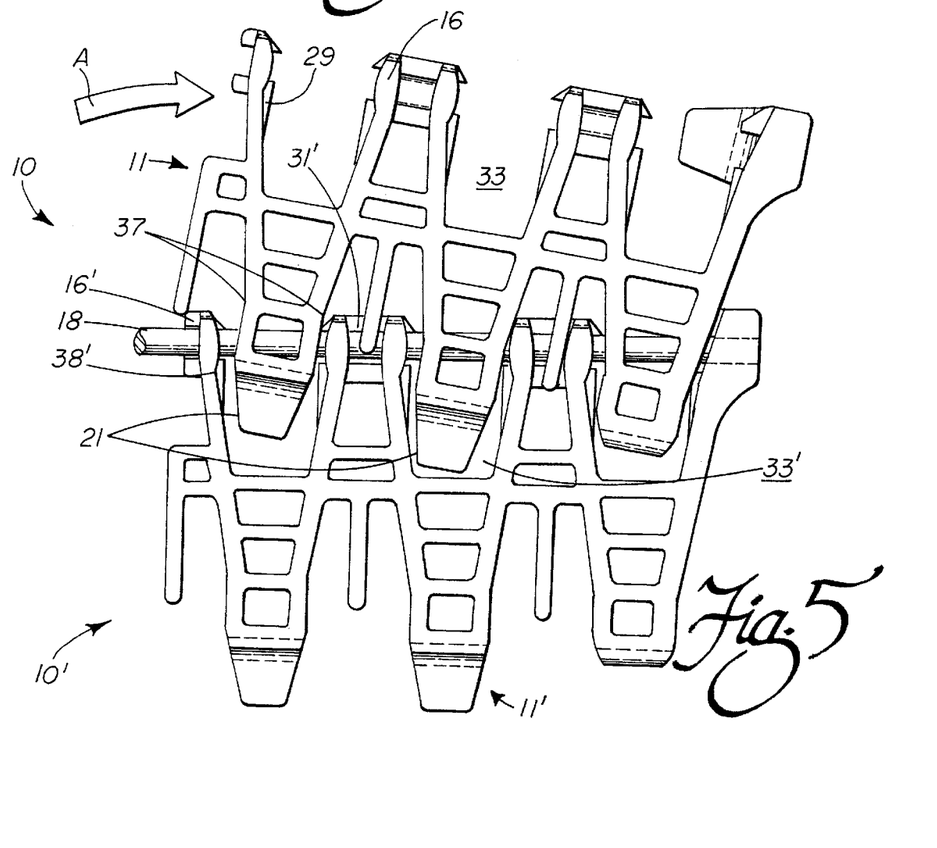
FIG. 5 is a top plan view showing the interaction between two modular link assemblies while maneuvering through a turn, as indicated by action arrow A.

With reference to FIG. 4, two modular link assemblies 10, 10', and their interaction during operation of the conveyor, are illustrated. During movement along a straight path, the conveyor is in an expanded or semi-expanded state, i.e. the rows of longitudinally repeating modules 10 are generally not compressed together. As best shown in FIG. 5, once the conveyor begins to negotiate a turn, the links 11, 11' or modules begin to compress differentially along the connector 18 across the conveyor.

When the modular link assemblies 10, 10' are in an expanded state (FIG. 4), gaps or openings exist between the links. For example, there are open spaces 33, 33' formed between legs 15, 15', respectively, and openings 35, 35' which are formed between the legs of adjoining repeating links 11, 11', respectively, adjacent the trailing apexes 16, 16'. Except for the inventive use of the tongue/finger concepts, it should be recognized that there exists the possibility for small articles, which are being transported upon the conveying surface, or foreign objects, to fall into these gaps/openings and become lodged. Thereafter, as the conveyor enters a turn and compression begins, the conveying surface is prevented from completely compressing together as intended. This necessitates stopping the conveyor for removing these articles/objects, or in many cases a complete cleaning operation, resulting in costly downtime. Furthermore, physical damage could possibly result to the articles being transported and/or the conveyor.

It can now be more fully seen how the tongue 21 and the finger 29, or an additional rearwardly extending finger in place of the tongue, form particularly important components in each module in establishing a closely interdigitating conveying surface, especially while maneuvering through a turn. As best shown in FIG. 5, the leading apex 13 and the tongue 21 can move all the way forward into the open space 33' and essentially close it. With the top side 23 of the tongue 21 being tapered downward, any small articles or objects of like type that happen to be present in open space 33' are lifted upward and out of the open space. Thus, the modules 10, 10' are allowed to fully compress together as intended, enabling the conveyor to properly negotiate the turn. Without the tapered tongue 21, any foreign objects present in open space 33' could become jammed between modules 10, 10'.

The projecting finger, such as forward finger 29, also moves during compression so as to aid in dislodging any foreign objects which may be present in the openings 35, 35'. This further prevents small articles or other objects from falling into or becoming jammed during turning of the conveyor. Additionally, the positioning of finger 29, the tongue 21 or rearwardly directed finger also provides for more structural support of the articles being transported on the conveyor over the openings 35, 35'.

As best shown in FIGS. 2 and 5, the improved modular link assembly 10 of the present invention further include two-way angled undercuts 37, 38 on legs 15 adjacent both the leading apex 13 and the trailing apex 16, respectively. The undercuts 37, 38 provide increased cooperation between the closely interconnected links 11 when the modules 10, 10' are maneuvering through curves and bends in the flow path. Specifically, the angled undercut 37 adjacent the leading apex 13 provides increased pivoting area for trailing apex 16' of the next forward link. Likewise, the angled undercut 38' adjacent the trailing apex 16' provides increased pivoting area for the leading apex 13 and the tongue 21. The undercuts 37, 38 operate in two ways, that is in either a right or left turn.

In addition, the assemblies 10 include side fins 39 adjacent the trailing apex 16 (see FIG. 2). When the conveyor is traversing a curve or bend, the side fins 39 engage the inside surface forming the slot 17 which passes through the leading apex 13. The side fins 39 thus serve as a means for helping guide the links 11 through the bends or curves.

The combination of the angled undercuts 37, 38 and the side fins 39 work in close cooperation to allow for smooth link interaction and the conveying surface to maintain its maneuverability without binding or jamming. The increased cooperation between the links 11 allows for a tighter turning radius to be achieved, but at the same time keeping the movement as smooth as possible. Not only are the current uses made more efficient and productive, but also alternative uses and locations for deploying modular link conveyors utilizing the improvement concepts of the present invention are provided.

In the first and second alternative embodiments, which are illustrated in FIGS. 6–9 and 10–11, respectively, the modular link assembly 10 is formed having both forwardly and rearwardly projecting fingers 29', 29" that form a portion of the conveying surface and serve to fill openings or gaps therein both in the expanded state and during longitudinal compression. In the first alternative embodiment, and with specific reference to FIG. 6, the fingers 29 take the form of arcuate projections 29' that extend both between the laterally repeating links and between the legs of each individual link 11. Along with the upper surfaces of the apexes 13, 16 and legs 15, it should be appreciated that the upper surfaces of these arcuate projections 29' form a part of the conveying surface and assist in providing enhanced structural support for the articles being conveyed.

Figure 7:
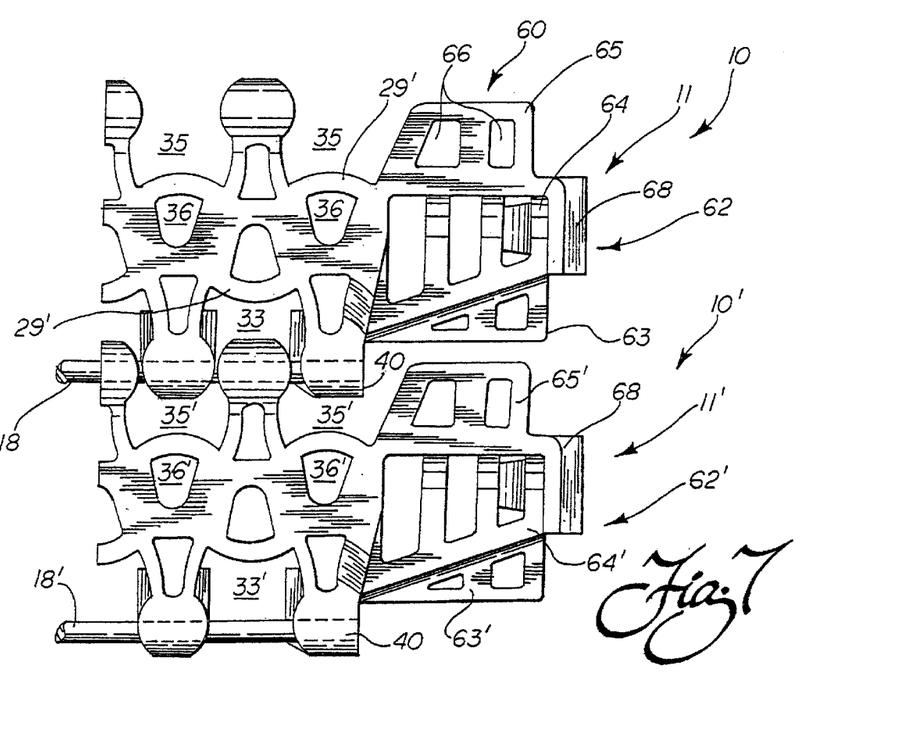
FIG. 7 is a cutaway top plan view showing the function of the projecting fingers and the interaction between the side links of two modular link assemblies of the first alternative embodiment while in an expanded state and traveling in a straight path.
Figure 8:
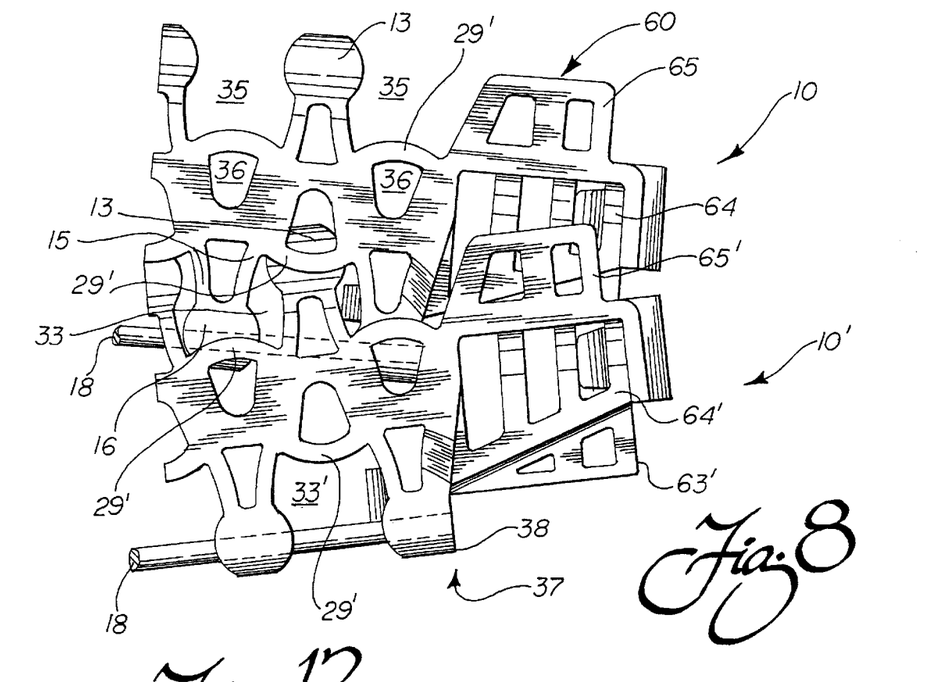
FIG. 8 is a top plan view showing the interaction between the projecting fingers and apexes of forward and rearward modular link assemblies while maneuvering through a turn and also illustrating the interleaving side wings.

In the expanded state, as illustrated in FIG. 7, the arcuate projections 29' are positioned in the gaps/open spaces/openings 33, 33', 35, 35' that are present between the forward and rearward modular link assemblies 10, 10'. In this position, projections 29' serve to prevent small articles or other debris from falling through the conveying surface. When full or partial compression occurs, such as during the negotiation of a turn (FIG. 8), the fingers 29' are moved into engagement with the respective leading or trailing apexes 13, 16. However, instead of providing a groove 31, the upper surfaces of both apexes 13, 16 are formed having a reduced vertical dimension relative to the conveying surface so as to overlie and lightly engage the underside of the fingers 29'. Therefore, as should be appreciated from viewing FIG. 8 illustrating the conveyor in a partially compressed state, the leading apex 13 of a rearward link 11' engages the rearwardly projecting finger 29' extending between the legs 15 of the forward link 11. At the same time the trailing apex 16 of the forward link 11 slides under the forwardly projecting finger 29' of the rearward link 11'. In this manner, the conveyor closely compresses for effectively and efficiently negotiating a tight turn, while at all times minimizing the gaps or open spaces between the links 11, 11' through which small articles or debris can be caught.

During expansion after full or partial compression, the forwardly and rearwardly projecting fingers 29' simply disengage from the apexes 13, 16 and return to their position in openings 33, 33', 35, 35'. It should also be noted that the proposed arcuate fingers 29' form a small triangular opening 36. These openings 36 assist in maintaining the desirable partially open conveying surface to provide the improved cleaning and inspection capabilities.

Figures 9, 11:
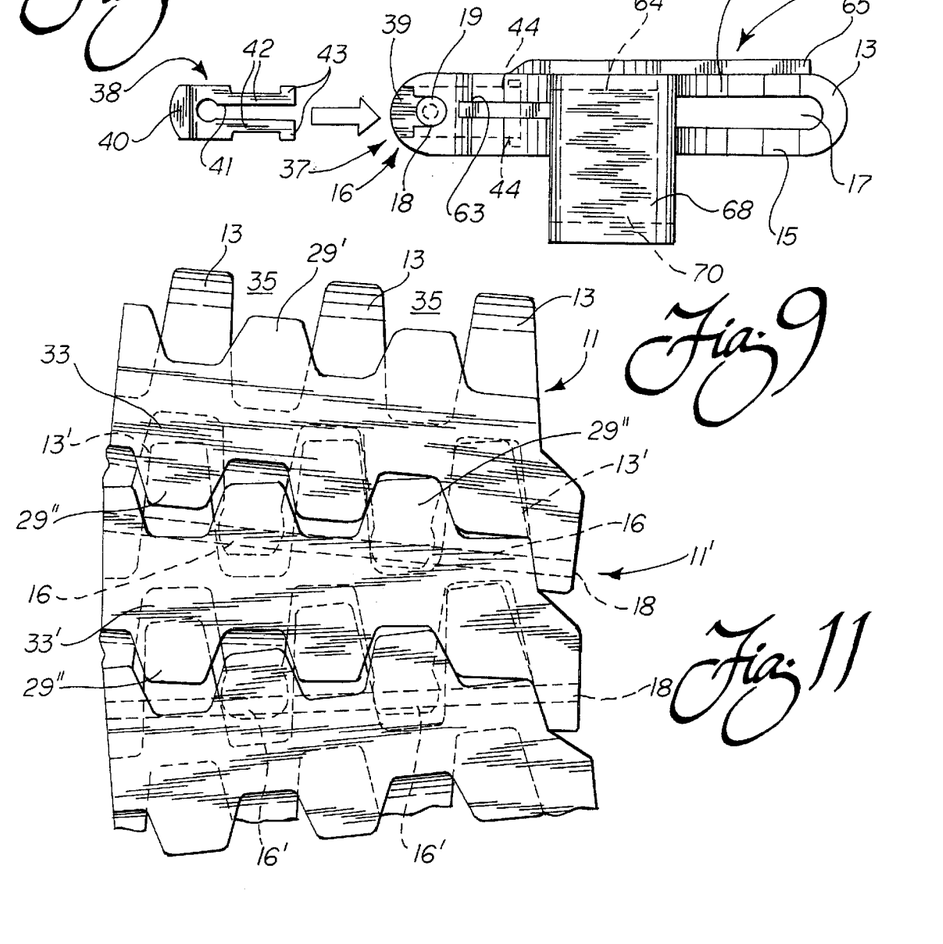
FIG. 9 is a side view of the multi-level wing of the side link showing an exploded view of the insertion of the locking tab to hold the transverse connector in place and form a side of the trailing apex of the side link.
FIG. 11 is a top plan view of the second alternative embodiment illustrating the interaction of forward and rearward links in the second alternative embodiment shown in FIG. 10.

As illustrated in FIG. 9, locking means 37 secures the transverse connector 18 in place to interconnect and retain the links 11 forming the modular link conveyor. Preferably, the locking means 37 includes a locking tab 38 that corresponds to a slot 39 in the trailing apex 16 of the outermost laterally repeating link 11 (or side link, as described in further detail below). More specifically, the locking tab 38 includes a head portion 40, opposed projections 41, and prongs 42 having feet 43.

The tab 38 is gripped by the head portion 40 and the prongs 42 are inserted into the slot 39 until the feet 43 drop into opposed notches 44 (see action arrow in FIG. 9). As this operation is completed, the projections 41 snap-fit over the reduced portion of the transverse connecter 18 (see dotted line depiction), thereby securely locking it in place in the transverse hole 19. The head portion 40 of the tab 38 is exposed and forms a portion of the outside face of the trailing apex 16 adjacent to the outermost side link 11.

Similar locking arrangements are shown and described in the above-referenced prior issued U.S. Pat. No. 4,953,693 and also in U.S. Pat. No. 5,031,757, the disclosure of which is also incorporated herein by reference.

Figure 10:
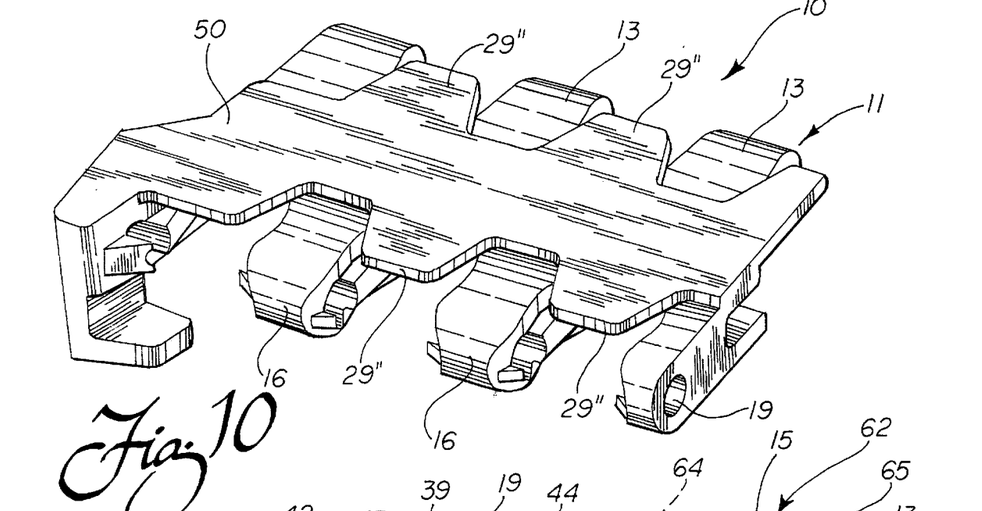
FIG. 10 is a perspective view of a second alternative embodiment wherein the modular link assembly is provided with a plate which forms the conveying surface and includes alternating forwardly and rearwardly projecting fingers.

In a second alternative embodiment of the present invention illustrated in FIGS. 10 and 11, the modular link assembly 10 includes a plate 50 which forms the conveying surface for supporting the articles being conveyed. The plate 50 is provided with alternating forwardly and rearwardly projecting fingers 29" in the form of relatively thin, substantially planar tab-like projections. Similar to the projecting fingers of the preferred 29 and first alternative 29' embodiments, the alternating projecting fingers 29" serve to fill the openings both between the legs 15 of the individual links 11 and between the adjoining legs of laterally repeating links. Although illustrated as an integral top portion of a unitary modular link assembly 10, it should be appreciated that the plate 50 can be formed as a separate element that is adapted to be secured to the top of the individual modular link assemblies 10. Alternatively, if a plurality of individual links form the link assembly, the plate may be formed in corresponding segments integral with or secured to the top of each individual link (not shown).

Similar to the preferred and first alternative embodiments, the links 11 in the second alternative embodiment include legs 15 that extend at an acute angle from a forward apex 13 having a slot (not shown) and terminate in trailing apexes 16 that include holes 19 for receiving a transverse connector (shown in phantom in FIG. 11). The connector 18 holds the links 11 together in both a laterally and longitudinally repeating fashion, as described above in the preferred embodiment, and may be locked in position in the manner described above using locking means, such as the locking tab 38 described above or the equivalent integral notch (not shown).

In the expanded position, the projecting fingers 29" of the plate 50 alternate forwardly and rearwardly, thereby advantageously serving to substantially close any gaps, openings, or open spaces 33, 33', 35, 35' existing between the link assemblies 10, 10'. As illustrated in FIG. 11, during longitudinal compression, the forwardly projecting fingers 29" of a rearward link assembly 10' engage the upper surface of the trailing apex 16 of the forward link assembly 10 and interfit with a U-shaped opening formed between the alternating projecting fingers 29". In a similar fashion, the rearwardly projecting fingers 29" of the forward link assembly 10 engage the upper surface of the leading apex 13' of the rearward link assembly 10'. As should be appreciated, the apexes 13, 13', 16, 16' are all provided with a reduced vertical dimension relative to the plate 50 to facilitate smooth compression of the conveyor such that the fingers 29" close the openings 33 between the legs 15 of the individual links 11 and the openings 35 between the adjoining legs of laterally repeating links. Together, the forwardly and rearwardly projecting fingers 29" serve to prevent small articles becoming trapped, while at all times allowing the conveyor to interdigitate and smoothly move into a fully or partially compressed state. Indeed, it has been observed that a conveyor formed using the interdigitating modular link assemblies 10, 10' of the first and second alternative embodiments can turn a very tight radius. The projecting fingers engage the upper surfaces of the leading/trailing apexes.

In accordance with another important aspect of the invention, the conveyer may also include special side links or as illustrated in FIGS. 6–9; an integral side link portion 60 forming a part of the modular link assembly 10 for positioning at the outermost side edges of the laterally repeating links. In the preferred embodiment, the side link portions 60 include wings 62, 62' having at least two tiers. These tiers allow the wing 62' of a rearward link 11' to engage and interleave with the wing 62 of a forward link 11 during longitudinal compression of the conveyor. For purposes of illustration only, the side links 60 are shown in FIGS. 6–9 as being integrally formed portions of the modular link assemblies 10 of the first alternative embodiment of the invention, as described in detail above. However, it should be appreciated that the arrangement described in the preferred embodiment, as well as those described in applicant's above-referenced issued patents, may also be adapted to and benefit from the inclusion of side wings similar to those shown and described while also providing the attendant advantages described herein.

Figure 6:
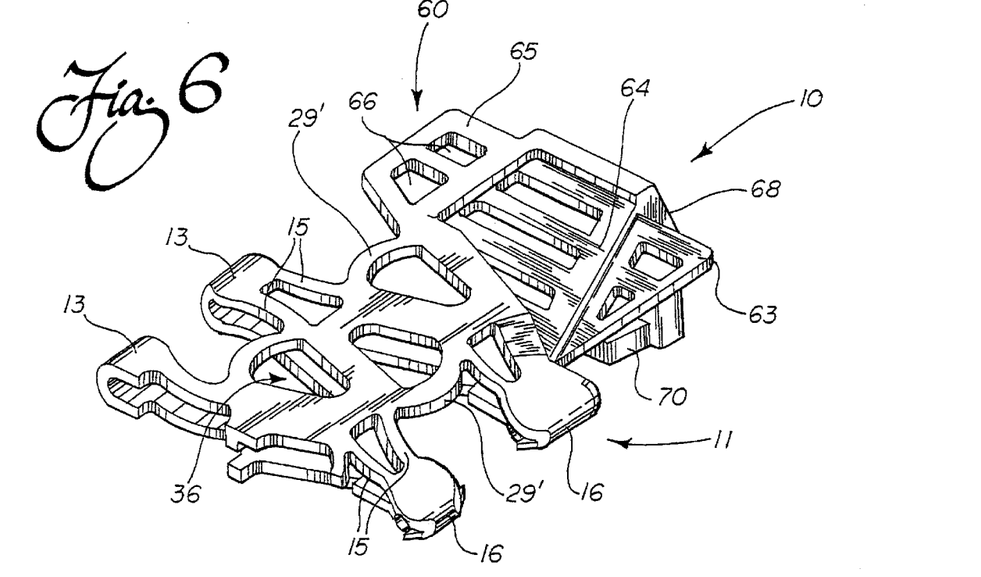
FIG. 6 is a perspective view showing a first alternative embodiment of the modular link assembly having both forwardly and rearwardly projecting fingers, wherein the fingers take the form of arcuate projections extending between the legs of adjacent links and between the legs of the individual links, respectively, and also illustrating the inclusion of a tiered wing to form a side link.

With specific reference to FIG. 6, the wing 62 is preferably formed having three tiers 63, 64, and 65. More specifically, each wing 62 includes a first, lower tier 63, 63', a second, or middle, tier 64, 64' and a third, or upper, tier 65, 65'. Preferably, the third tier 65 is coextensive with the conveying surface, with the second 64 and first 63 tiers stepping down vertically to a position lower than the conveying surface (see in particular FIG. 9). As illustrated, the tiers 63, 64, 65 are preferably provided with small openings 66 to facilitate cleaning of the conveyor, but it is within the broadest aspects of the invention to resize or completely remove these openings, depending on the characteristics of the articles being conveyed.

As best shown in FIG. 9, a depending arm 68 is provided adjacent to the middle tier 64 of each wing 62. The depending arm 68 assists in guiding the conveyor along a guide rail or the like. From the lower portion of the arm 68 extends an inwardly projecting guide tab 70 (see also FIG. 6). Together, the arm 68 assists in guiding the conveyor by engaging the sides of a guide rail (not shown), while the inwardly projecting guide tab 70 is provided to engage the underside of a lip formed in the guide rail or similar structure for edge hold down on the forward run and supporting the conveyor during inversion, such as occurs during the return run.

When the conveyor is in an expanded state such as is illustrated in FIG. 7, the wings 62, 62' are positioned such that the forward margin of the third tier 65' of the rearward link 11' is positioned above and longitudinally adjacent to the rear margin of the first tier 63 of the forward link 11. In this position, it should be appreciated that the wings 62, 62' serve to substantially close up any gaps, openings, or open spaces that would otherwise be present between the forward/rearward side links 11, 11'. This of course significantly reduces the ability of small articles being conveyed or debris to lodge along the side edges of the conveyor.

As the conveyor traverses a turn and is fully or partially compressed, the multi-tiered wings 62, 62' advantageously interleave along the multi-level tiers 63, 63', 64, 64', 65, 65' to permit smooth full or partial compression of the forward/rearward side links 11, 11' (FIG. 8). More specifically, as the conveyor compresses, the third tier 65' of the rearward side link 11' moves into engagement with the middle tier 64 of the forward side link 11. In this position, the first tier 63 of the forward wing 62 engages the underside of the middle tier 64' of the rearward side wing 62'. It should be appreciated that in this interleaving position, the small gaps or openings between the forward/rearward side links are completely closed. A second middle tier portion (not shown) may also be included below the middle tier 64' of each link to provide a slot (not shown) for assisting in receiving and guiding the first tier 63' of the forward link 11 as the conveyor compresses.

Figure 12:
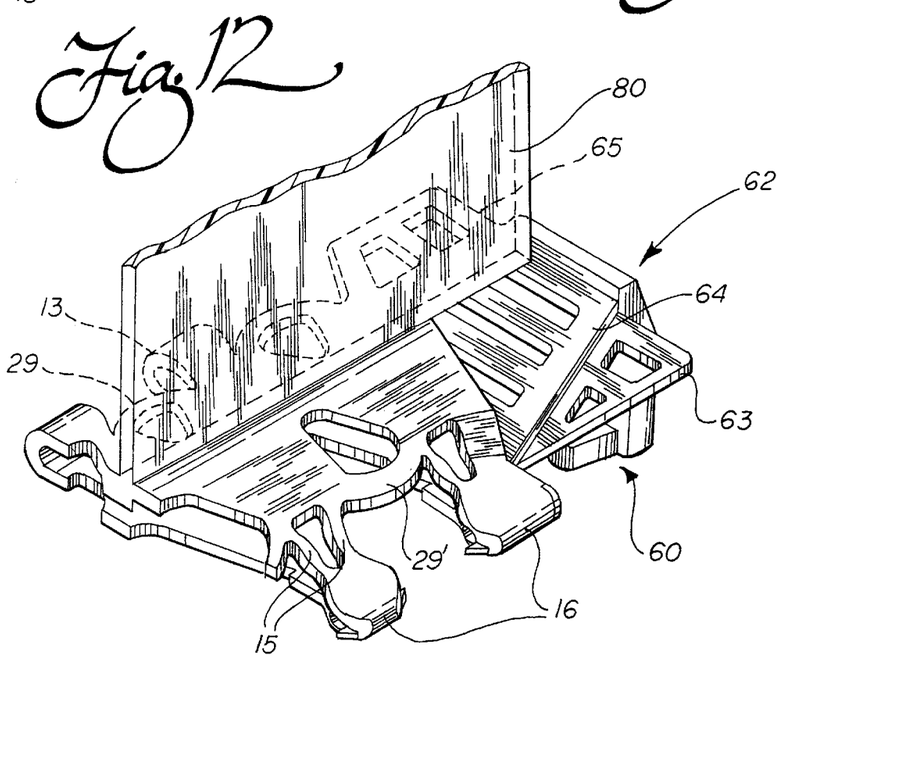
FIG. 12 is a perspective view of the modular link assembly of the first embodiment showing the addition of an upstanding pusher flange for positively engaging articles being conveyed.

Other modifications to the modular link assemblies 11 of each embodiment proposed above are possible, including the addition of upstanding pusher elements 80 to positively engage the articles being conveyed. The pusher elements or flanges 80 may be formed across a single modular link assembly 10, as illustrated in FIG. 12, or may be formed individually on each link 11 (not shown) or across two or more links, depending on the desired arrangement.

In summary, numerous benefits have been described which result from employing the concepts of the present invention. The modular link conveyor assemblies 10, and more specifically the links 11, are capable of establishing a close interdigitating grid conveying surface. The tongue 21 and the finger(s), such as the finger 29, work in cooperation to eliminate any undesirable or unnecessary openings or gaps in the conveying surface. This minimizes the possibility of small articles or other objects present on or near the conveying surface from becoming jammed in the openings/gaps and disrupting the operation of the conveyor. Advantageously, the tongue 21 occupies opening 33, and with its tapered top side 23 is capable of lifting upward any article or foreign object inadvertently present. Furthermore, the rearwardly projecting fingers 29 dislodge any article or foreign object present in opening 35. The presence of the grooves in the apex 16, such as groove 31, and if desired in the apex 13, receives the corresponding finger 29. The groove(s) are open to improve the cleaning and inspection functions. Additionally, the angled undercuts 37, 38 and the side fins 39 compliment the action of the finger 29 by providing a guiding action to assure that the conveyor is able to traverse curves and bends in an efficient and smooth manner. In a first alternative embodiment, the fingers 29' take the form of arcuate projections that extend between the leading and/or trailing apexes of the laterally repeating links (FIGS. 6–9). The apexes 13, 16 are tapered to allow the arcuate projection to engage an upper surface thereof during compression of the conveyor. In a second alternative embodiment, the modular link assemblies 11 include a plate 50 having alternating forwardly and rearwardly projecting fingers 29" that serve to substantially fill the openings 33 in a similar fashion (FIGS. 10–11).

In accordance with another improvement feature, special links are provided having side portions that include interleaving wings 62, 62'. The wings 62, 62' serve the dual function of supporting guide means and closing open spaces adjacent the side edges of the conveyor (FIGS. 6–9). Locking tab 38 secures the links 11 together by snapping on the ends of the connectors 18. Additionally, upstanding pusher elements 80 may be provided on one or more of the links 11 for positively engaging the articles being conveyed. In final analysis, the improvement concepts of all proposed embodiments of the present invention cooperatively work together in an unusually exceptional manner so as to create an all around proper functioning and efficient modular link conveyor.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

What is claimed is:

1. A modular link conveyor for moving articles along a path, the improvement comprising:
   a plurality of modular link assemblies forming a conveying surface including a plurality of laterally and longitudinally disposed repeating links defining an interdigitating grid, each of said links including a first apex and two legs extending therefrom, said first apex further including a slot passing transversely therethrough across substantially the full width of said link, said legs further terminating in second apexes, each said second apex including a hole passing transversely therethrough, adjoining legs of said laterally repeating links forming a first opening;
   a plurality of transverse connecting means passing through said slots and said holes to connect said longitudinally repeating modular links together; and
   a first projecting finger positioned between said laterally repeating links in said first opening;
   whereby said first projecting finger limits entry of any foreign objects in said first opening.

2. The modular link conveyor according to claim 1, wherein a second opening is defined between said legs of said links and each of said links further includes a second projecting finger positioned between said legs in said second opening.

3. The modular link conveyor according to claim 2, wherein said first and second projecting fingers are arcuate projections extending across said first and second openings.

4. The modular link conveyor according to claim 3, wherein said first projecting finger projects forwardly and said second projecting finger projects rearwardly relative to the direction of travel of the conveyor.

5. The modular link conveyor according to claim 2, wherein said first and second apexes are formed having a reduced vertical dimension relative to said conveying surface for engaging the projecting fingers of longitudinally repeating links during compression of the conveying surface.

6. The modular link conveyor according to claim 1, wherein said plurality of modular links include side links for positioning at the outermost sides of s aid laterally repeating links, said second apex of each of said side links including locking means for securing said transverse connecting means in place.

7. The modular link conveyor according to claim 6, wherein said second apex includes a slot and said locking means is a locking tab adapted for insertion in said slot.

8. The modular link conveyor according to claim 7, wherein the head of said locking tab partially forms a side face of said second apex of said side link.

9. The modular link conveyor according to claim 1, wherein said plurality of modular links include a pair of side links for positioning at the outermost sides of said laterally repeating links, each of said side links formed by the inclusion of a wing forming a part of the conveying surface and carrying a depending arm for assisting in guiding said conveyor.

10. The modular link conveyor according to claim 9, wherein said depending arm includes an inwardly extending transverse tab.

11. The modular link conveyor according to claim 9, wherein said wing is formed having at least two tiers, whereby said tiers permit the wings of longitudinally repeating links to interleave in response to compression of the conveying surface.

12. The modular link conveyor according to claim 1, further including an upstanding pusher element carried on at least one of said links for positively engaging articles being conveyed.

13. A modular link for cooperating with other links in a conveyor for moving articles along a path comprising:
   a first apex and two legs extending therefrom forming an open space in between, a slot passing transversely therethrough across substantially the full width of said link, said legs further terminating in a second apex, each said second apex including a hole passing transversely therethrough;

an arcuate projecting finger positioned between said legs to limit the entry of any foreign objects in said open space.

14. A modular link conveyor for moving articles along a path, the improvement comprising:

a plurality of modular link assemblies including a plurality of laterally and longitudinally disposed repeating links defining an interdigitating grid, each of said links including a first apex and two legs extending therefrom defining a first opening, said first apex further including a slot passing transversely therethrough across substantially the full width of said link, said legs further terminating in a second apex, each said second apex including a hole passing transversely therethrough, said adjoining legs of said laterally repeating links defining a second opening; and a plurality of transverse connecting means passing through said slots and said holes to connect said longitudinally repeating modular links together;

said plurality of modular link assemblies including a plate forming a conveying surface, said plate having alternating forwardly and rearwardly projecting fingers for substantially filling said first and second openings and limiting the entry of foreign objects.

15. The modular conveyor according to claim 14, wherein said plate is integrally formed with said modular link assemblies.

16. A modular link conveyor for moving articles along a path, the improvement comprising:

a plurality of modular link assemblies forming a conveying surface including a plurality of laterally and longitudinally disposed repeating links defining an interdigitating grid, each of said links including a first apex and two legs extending therefrom, said first apex further including a slot passing transversely therethrough across substantially the full width of said link, said legs further terminating in second apexes, each said second apex including a hole passing transversely therethrough; and a plurality of transverse connecting means passing through said slots and said holes to connect said longitudinally repeating modular links together;

said plurality of laterally repeating modular links including a pair of side links for positioning at the outermost sides of said laterally repeating links, each of said side links formed by the inclusion of a wing having at least two tiers;

whereby longitudinal compression of said conveying surface results in said wings of said longitudinally repeating side links interleaving to limit the entry of any foreign objects.

17. The conveyor according to claim 16, wherein said wings carry a depending arm for guiding said conveyor.

18. The conveyor according to claim 17, wherein said depending arm further includes an inwardly extending transverse tab.

19. The conveyor according to claim 16, further including an upstanding pusher element carried on at least one of said links for positively engaging articles being conveyed.

20. The conveyor according to claim 16, wherein a first opening is defined between the legs of each of said links and a second opening is defined between the adjoining legs of said laterally repeating links, said conveyor further including first and second projecting fingers for occupying said first and second openings and limiting the entry of any foreign objects.

* * * * *